US012689163B2

(12) United States Patent
Xiao et al.

(10) Patent No.: US 12,689,163 B2
(45) Date of Patent: Jul. 21, 2026

(54) CONNECTOR WITH TERMINAL MODULE AND SHIELDING PART

(71) Applicant: HUAWEI TECHNOLOGIES CO., LTD., Shenzhen (CN)

(72) Inventors: Congtu Xiao, Dongguan (CN); Wang Xiong, Dongguan (CN); Yiquan Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/481,353

(22) Filed: Oct. 5, 2023

(65) Prior Publication Data

US 2024/0039213 A1 Feb. 1, 2024

Related U.S. Application Data

(63) Continuation of application No. PCT/CN2022/080767, filed on Mar. 14, 2022.

(30) Foreign Application Priority Data

Apr. 8, 2021 (CN) ......................... 202110378871.7

(51) Int. Cl.
*H01R 13/6597* (2011.01)
*H01R 13/6471* (2011.01)
(Continued)

(52) U.S. Cl.
CPC ..... *H01R 13/6597* (2013.01); *H01R 13/6471* (2013.01); *H01R 13/6581* (2013.01);
(Continued)

(58) Field of Classification Search
CPC ........................ H01R 13/6597; H01R 13/6471
See application file for complete search history.

(56) References Cited

U.S. PATENT DOCUMENTS 6,692,271 B2 * 2/2004 Watanabe ............ H01R 12/716 439/541.5
6,699,068 B2 * 3/2004 Wu .................... H01R 12/7029 439/594

(Continued)

FOREIGN PATENT DOCUMENTS

CN 203277706 U 11/2013
CN 204858048 U 12/2015

(Continued)

OTHER PUBLICATIONS

PCT International Search Report for Application No. PCT/CN2022/080767 dated Apr. 8, 2021, 119 pages.

(Continued)

*Primary Examiner* — Marcus E Harcum

(57) ABSTRACT

A connector may be disposed in the communication device, and may be signally connected to a circuit board in the communication device. The connector may include a terminal module and a shielding part. The terminal module includes a plurality of connection terminals, and the plurality of connection terminals include a signal terminal and a ground terminal. The connection terminal includes a first end, a second end, and a terminal body that connects the first end and the second end. The shielding part includes a shielding body and a contact arm. In addition, the contact arm may be elastically abutted against the ground terminal, to implement an electrical connection between the contact arm and the ground terminal. By using the connector provided in this application, crosstalk performance of the terminal module can be improved, to enhance signal transmission performance of the communication device.

19 Claims, 9 Drawing Sheets

(51) Int. Cl.

| | |
|---|---|
| ***H01R 13/6581*** | (2011.01) |
| ***H01R 13/6586*** | (2011.01) |
| *H01R 12/55* | (2011.01) |
| *H01R 12/75* | (2011.01) |
| *H01R 13/652* | (2006.01) |

(52) U.S. Cl.

CPC ......... *H01R 13/6586* (2013.01); *H01R 12/55* (2013.01); *H01R 12/75* (2013.01); *H01R 13/652* (2013.01)

(56) References Cited

U.S. PATENT DOCUMENTS

| | | | | |
|---|---|---|---|---|
| 7,074,085 | B2 * | 7/2006 | Chen | H01R 13/658 439/108 |
| 7,416,447 | B1 * | 8/2008 | Chen | H01R 12/727 439/607.05 |
| 7,604,504 | B2 * | 10/2009 | Cheng | H01R 13/6594 439/607.33 |
| 8,864,506 | B2 * | 10/2014 | Little | H01R 13/658 439/108 |
| 9,728,903 | B2 * | 8/2017 | Long | H01R 12/724 |
| 9,799,994 | B2 * | 10/2017 | Chen | H01R 12/775 |
| 9,972,945 | B1 * | 5/2018 | Huang | H01R 13/6585 |
| 10,367,313 | B2 * | 7/2019 | Wu | H01R 13/6585 |
| 10,424,878 | B2 * | 9/2019 | Lloyd | H01R 12/716 |
| 10,587,079 | B2 * | 3/2020 | Ba | H01R 13/639 |
| 11,011,873 | B2 * | 5/2021 | Peloza | H01R 13/6471 |
| 11,381,038 | B1 * | 7/2022 | Patel | H01R 13/65914 |
| 11,888,264 | B2 * | 1/2024 | Chen | H01R 13/502 |
| 12,266,895 | B2 * | 4/2025 | Huang | H01R 13/6587 |
| 2004/0009687 | A1 * | 1/2004 | Vicich | H01R 13/658 439/108 |
| 2004/0242036 | A1 * | 12/2004 | Schempp | H01R 13/64 439/108 |
| 2014/0024257 | A1 | 1/2014 | Castillo et al. | |
| 2019/0214755 | A1 | 7/2019 | Manickam | |
| 2020/0076131 | A1 | 3/2020 | Hu et al. | |
| 2020/0287332 | A1 * | 9/2020 | Chen | H01R 13/6586 |
| 2020/0313358 | A1 * | 10/2020 | Casher | H01R 13/6471 |
| 2021/0075143 | A1 * | 3/2021 | Laurx | H01R 12/716 |
| 2021/0265784 | A1 * | 8/2021 | Hsiao | H01R 24/62 |
| 2021/0313721 | A1 * | 10/2021 | Little | H01R 13/6272 |
| 2021/0320448 | A1 * | 10/2021 | Chung | H01R 13/6477 |
| 2021/0351547 | A1 * | 11/2021 | Little | H01R 13/6581 |
| 2022/0102902 | A1 * | 3/2022 | Lin | H01R 13/6471 |
| 2022/0115816 | A1 * | 4/2022 | Huang | H01R 12/75 |
| 2022/0123510 | A1 * | 4/2022 | Li | H01R 13/6592 |
| 2022/0173550 | A1 * | 6/2022 | Liu | H01R 13/6585 |
| 2022/0216635 | A1 * | 7/2022 | Little | H01R 13/6471 |
| 2022/0216653 | A1 * | 7/2022 | Little | H01R 13/424 |
| 2022/0231464 | A1 * | 7/2022 | Chen | H01R 12/727 |
| 2023/0387632 | A1 * | 11/2023 | Ikari | H01R 13/6471 |

FOREIGN PATENT DOCUMENTS

| | | | |
|---|---|---|---|
| CN | 105428860 | A | 3/2016 |
| CN | 105811178 | A | 7/2016 |
| CN | 106450853 | A | 2/2017 |
| CN | 206712072 | U | 12/2017 |
| CN | 108352633 | A | 7/2018 |
| CN | 207868438 | U | 9/2018 |
| CN | 110086018 | A | 8/2019 |
| CN | 108631100 | B | 6/2020 |
| CN | 112072409 | A | 12/2020 |
| TW | I604674 | B | 11/2017 |

OTHER PUBLICATIONS

European Extended Search Report for Application No. 22783847 dated Aug. 8, 2024, 9 pages.

* cited by examiner

CONNECTOR WITH TERMINAL MODULE AND SHIELDING PART

CROSS-REFERENCE TO RELATED APPLICATIONS

This application is a continuation of International Application No. PCT/CN2022/080767, filed on Mar. 14, 2022, which claims priority to Chinese Patent Application No. 202110378871.7, filed on Apr. 8, 2021. The disclosures of the aforementioned applications are hereby incorporated by reference in their entireties.

TECHNICAL FIELD

This application relates to the field of communication technologies, and in particular, to a connector and a communication device.

BACKGROUND

In a communication equipment system, an interconnection system based on a combination of a carrier board and a daughter card of a printed circuit board (PCB) is the most common interconnection architecture. Various daughter cards can be connected to the carrier board through connectors. The connector is a key component for connecting the carrier board and the daughter card, and performance of the connector has important impact on signal transmission of the entire communication equipment system.

With the rapid development of a communication device, a user imposes a high requirement on a signal transmission speed and communication costs of the communication device. Currently, a serializer/deserializer (Serdes) is configured to convert a plurality of low-speed parallel signals of a transmitting end into high-speed serial signals, and after the high-speed serial signals are transmitted to a receiving end through a transmission medium (an optical cable or a copper wire), the high-speed serial signals are converted into the low-speed parallel signals again. Therefore, the signal transmission speed can be effectively improved without changing a quantity of pins of the connector, and the communication costs can be reduced.

In a current communication equipment system, as a rate and power of the Serdes increase, crosstalk gradually becomes a main factor that affects the performance of the connector. Therefore, a shielding manner and shielding performance of the connector become critical.

However, an excessively complex shielding structure design causes an increase in complexity of a model and processing costs, and also causes difficulty of implementing assembly and automation, resulting in reducing stability of shielding contact and deteriorating the shielding performance.

SUMMARY

This application provides a connector and a communication device, to improve crosstalk in the connector and improve signal transmission performance of the communication device.

According to a first aspect, this application provides a connector, where the connector includes a terminal module and a shielding part, the terminal module includes a plurality of connection terminals, and the plurality of connection terminals include a signal terminal and a ground terminal. The connection terminal includes a first end, a second end, and a terminal body that connects the first end and the second end. The shielding part includes a shielding body and a contact arm, and the contact arm is fastened to the shielding body. In this application, the first end and the second end of the connection terminal may be used as connection ends. Therefore, the shielding body may cover at least a part of the terminal body, to shield the connection terminal. In addition, the contact arm may be elastically abutted against the ground terminal, to implement an electrical connection between the contact arm and the ground terminal. By using the connector provided in this application, crosstalk performance of the terminal module can be effectively improved, to improve signal transmission performance of a communication device using the connector.

In a possible implementation of this application, the connection terminal may further include a fastening part, and the fastening part may be fastened to terminal bodies of the plurality of connection terminals, to fix the plurality of connection terminals. In addition, the fastening part may be filled between two adjacent connection terminals, to avoid a short circuit between the connection terminals.

To ensure stable contact between the contact arm and the ground terminal, the shielding part may be fastened to the terminal module. During specific implementation, a mounting hole may be disposed on the shielding part, and a holding structure may be disposed on the fastening part. The holding structure may be inserted into the mounting hole, and the holding structure may be clamped in an interference fit with the mounting hole. In some other implementations of this application, the shielding part may be fastened to the terminal module in a manner such as hot riveting, or welding.

In a possible implementation of this application, the shielding part may further include an abutting part connected to the shielding body, and the abutting part may be abutted against the fastening part, to limit spacing between the shielding body and the connection terminal, and avoid a short circuit between signal terminals caused by contact between the shielding body and the signal terminal in the connection terminal.

In addition, the shielding part may further include an extension part connected to the shielding body, and the extension part extends from the shielding body to the second end of the connection terminal. The contact arm may also be disposed at an end that is of the extension part and that is away from the shielding body, and the contact arm is also in conductive contact with the ground terminal. In this way, a signal return path can be effectively increased, and crosstalk of the connection terminal can be improved.

In a possible implementation of this application, spacing between adjacent connection terminals and spacing between the connection terminal and the shielding part are reduced, to implement a tight coupling of an electric field in an area. In this way, an insertion loss and crosstalk can be reduced, and a dependence degree of the connector on the shielding part can be effectively reduced. For example, because the plurality of connection terminals may generally include a plurality of signal terminals and a plurality of ground terminals, spacing between two adjacent signal terminals may be 0.7 to 2.5 times a thickness of the signal terminal, spacing between the signal terminal and an adjacent ground terminal is 0.7 to 2.5 times the thickness of the signal terminal, and spacing between the signal terminal and the shielding part is 0.7 to 2.5 times the thickness of the signal terminal.

In addition, connection terminals at corresponding positions of two terminal modules that are disposed close to each other are disposed in a staggered manner, so that partial crosstalk cancellation can also be implemented. In some possible implementations of this application, the connector includes two terminal modules, and the two terminal modules are fit to each other. In an arrangement direction of the plurality of connection terminals, signal terminals at corresponding positions of the two terminal modules are disposed in a staggered manner, and ground terminals at the corresponding positions of the two terminal modules are disposed in a staggered manner.

It can be understood that, the ground terminals at the corresponding positions of the two terminal modules are disposed in a staggered manner, so that contact points of contact arms of shielding parts of the two terminal modules can be disposed in a staggered manner, to effectively implement partial crosstalk cancellation, and improve crosstalk.

For the two terminal modules that are fit to each other, the shielding part may be disposed separately for each terminal module. In this way, a pressing block may be further disposed between the two terminal modules, and the pressing block may be configured to press the shielding part towards the corresponding terminal module, to improve reliability of contact between the contact arm of the shielding part and the ground terminal.

In a possible implementation of this application, the shielding part may be an integrally formed structure, and the contact arm may be a bent part that is formed on the shielding body and that is bent towards a side of the ground terminal. In this way, a structure of the shielding part can be simplified, and assembly between the shielding part and the terminal module can be simplified.

In a possible implementation of this application, the connector may further include a housing, and the housing has a first surface and a second surface that are disposed opposite to each other. In addition, the housing is provided with a mounting groove, and the mounting groove runs through the housing in a direction from the first surface to the second surface. The terminal module may be mounted in the mounting groove, so that the housing supports and protects the terminal module.

The first end of the connection terminal may be exposed from the first surface, and the first end may be signally connected to a circuit board. In addition, the second end of the connection terminal is exposed from the second surface, and the second end is connected to a cable. In this way, the cable may be connected to another external device, to implement signal connection between the another device and the circuit board.

The housing may be made of a metal material. In a possible implementation, the shielding part further includes a contact point, and the contact point may be disposed on the shielding body. In addition, after the terminal module is mounted with the housing, the contact point may be in conductive contact with the housing, so that a signal return path may be increased, to improve crosstalk.

In some possible implementations of this application, the connector may further include a protection structure, and the protection structure may protect and fix the terminal module. During specific implementation, the protection structure may cover the terminal module, and is fastened to the terminal module and the housing.

In addition to the foregoing manner of disposing the housing, in another possible implementation of this application, the housing may include a fixed housing and a conductive housing. The fixed housing has a first surface and a second surface that are disposed opposite to each other. The fixed housing includes a mounting groove, and the mounting groove runs through the housing in a direction from the first surface to the second surface. The terminal module is mounted in the mounting groove, and the conductive housing is disposed to cover the terminal module, to implement grounding of the terminal module.

In this disposing manner, the first end of the connection terminal may be hidden in the fixed housing, and a circuit board may be inserted into the mounting groove on a side of the first surface of the fixed housing, to implement signal connection to the first end of the connection terminal. In addition, the second end of the connection terminal may be exposed from the second surface, and the second end is connected to a cable. The cable may be connected to another external device, to implement signal connection between the another device and the circuit board.

According to a second aspect, this application further provides a communication device. The communication device may be but is not limited to a notebook computer, a mobile phone, a tablet computer, or the like. The communication device may include a circuit and the connector in the first aspect. A connection terminal of the connector may be signally connected to the circuit, and another device may implement indirect signal connection to a circuit board by using the connector. Because crosstalk of the connector provided in this application is significantly improved, signal transmission performance of the communication device can be effectively improved.

REFERENCE NUMERALS

Figure 1:
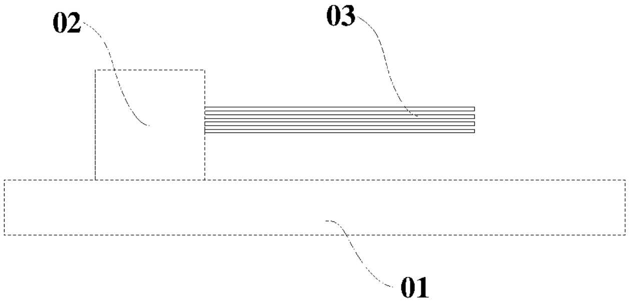
FIG. 1 is a schematic diagram of a structure of a communication device according to an embodiment of this application.

01—Structural part; 02—Connector; 03—Cable;
1—Housing; 1*a*—Fixed housing; 1*b*—Conductive housing; 101—First surface; 102—Second surface; 103—Mounting groove;
104—Limit structure; 2—Terminal module; 201—Connection terminal; 201*a*—Ground terminal; 201*b*—Signal terminal;
2011—First end; 2012—Second end; 2013—Terminal body; 202—Fixing part; 2021—Holding structure;
3—Protection structure;
4—Cable; 5—Shielding part; 501—Shielding body; 5011—Mounting hole; 502—Contact arm; 503—Abutting part; 504—Contact point;
505—Extension part; 6—Plug

DESCRIPTION OF EMBODIMENTS

To make the objectives, technical solutions, and advantages of this application clearer, the following further describes this application in detail with reference to the accompanying drawings. It should be noted that in descriptions of this application, "at least one" means one or more, and "a plurality of" means two or more. In view of this, in embodiments of the present invention, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, it should be understood that, in the descriptions of this application, terms such as "first" and "second" are merely used for distinguishing and description, but should not be understood as indicating or implying relative importance, or should not be understood as indicating or implying a sequence.

Reference to "an embodiment", "some embodiments", or the like described in this specification indicates that one or more embodiments of this application include a specific feature, structure, or characteristic described with reference to the embodiment. Therefore, in this specification, statements, such as "in an embodiment", "in some embodiments", "in some other embodiments", and "in other embodiments", that appear at different places in this specification do not necessarily mean reference to a same embodiment, instead, they mean "one or more but not all of the embodiments", unless otherwise specifically emphasized. The terms "include", "comprise", "have", and their variants all mean "include but is not limited to", unless otherwise specifically emphasized.

To facilitate understanding of a connector provided in embodiments of this application, an application scenario of the connector provided in embodiments of this application is first described. The connector provided in embodiments of this application may be applied to various communication devices. For example, the connector may be applied to a communication device such as a notebook computer, a mobile phone, or a tablet computer. As a connection component in the communication device, the connector may be used as a bridge for connecting between various functional modules, to implement signal transmission between the functional modules.

Reference may be made to FIG. 1. FIG. 1 is a schematic diagram of a structure of a communication device according to an embodiment of this application. The communication device includes a structural part 01 and a connector 02, and the connector 02 is signally connected to the structural part 01. As shown in FIG. 1, the connector 02 may be further connected to a cable 03, and the cable 03 may be connected to another device, to implement signal connection between the another device and the structural part 01.

In a current communication equipment system, as a rate and power of a Serdes increase, crosstalk gradually becomes a main factor that affects performance of the connector. The crosstalk refers to a coupling effect of interference caused by a harmful electrical signal generated when a harmful signal is transmitted from one network to another network. In this application, the crosstalk is crosstalk between different connection terminals (where the connection terminal is a metal lead used to transmit a signal or provide a return path for the signal) in the connector. Therefore, a shielding manner and shielding performance of the connector become critical.

However, an existing shielding structure solution of the connector is excessively complex, which causes an increase in processing costs of a shielding structure. In addition, this also causes difficulty of implementing assembly and automation of the shielding structure in the connector, resulting in reducing stability of shielding contact and deteriorating the shielding performance.

The connector provided in this application is intended to resolve the foregoing problem, to improve the crosstalk in the connector and improve signal transmission performance of the communication device.

Figure 2:
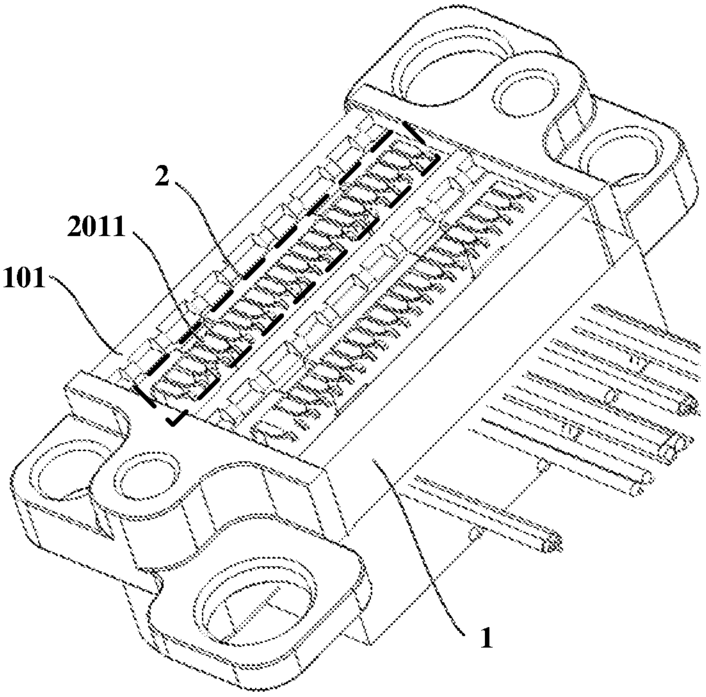
FIG. 2 is a schematic diagram of a structure of a connector according to an embodiment of this application.

Refer to FIG. 2. FIG. 2 shows a structure of a connector according to an embodiment of this application. The connector may be, for example, a connector for a carrier board disposed on the carrier board. In this embodiment, the connector may include a housing 1 and a terminal module 2. The housing 1 serves as a bearing part of the entire connector, and may be configured to support and fix the terminal module 2. In addition, in some embodiments of this application, the housing 1 may be fastened to a circuit board (not shown in the figure), and the circuit board may be but is not limited to a printed circuit board (PCB) or a flexible circuit board (FPC). The terminal module 2 is mounted on the housing 1, and the terminal module 2 may be signally connected to the circuit board, so that signal transmission between the connector and the circuit board can be implemented.

Figure 3:
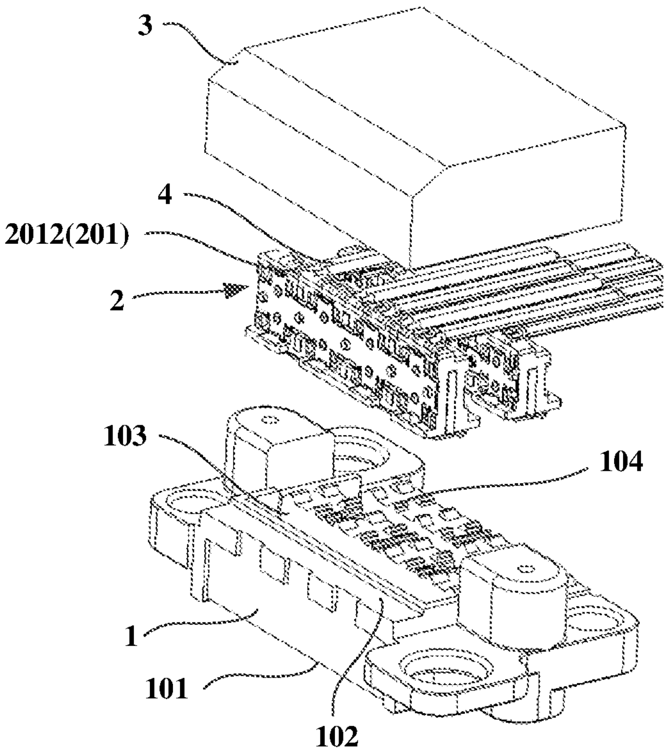
FIG. 3 is a schematic diagram of a split structure of a connector according to an embodiment of this application.

For ease of understanding the structure of the connector in this embodiment of this application, reference may be made to FIG. 3. FIG. 3 is a schematic diagram of a split structure of the connector according to FIG. 2. The connector in this embodiment may further include a protection structure 3. As shown in FIG. 3, the protection structure 3 may be but is not limited to a block structure, and the protection structure 3 covers the terminal module 2 and is fastened to the terminal module 2 and the housing 1. After the terminal module 2 is mounted on the housing 1, the protection structure 3 may be configured to fix the terminal module 2 and the housing 1. In addition, the protection structure 3 may be made of, but is not limited to, a material such as plastic. Therefore, the protection structure 3 may further protect the terminal module 2. It may be understood that the protection structure 3 may be directly molded on the terminal module 2 and the housing 1 by using an injection molding technique, to improve a sealing effect of the protection structure 3 on the terminal module 2.

Reference may be still made to FIG. 3. In some embodiments of this application, when the housing 1 is specifically disposed, for example, a material of the housing 1 may be an alloy material such as a ferroalloy, an aluminum alloy, or a copper alloy, or may be a single metal material having large rigidity. A specific shape of the housing 1 is not limited in this application. For example, a cross section shape of the housing 1 may be a regular shape such as a rectangle, a circle, or a trapezoid, or may be another irregular shape.

Reference may be still made to FIG. 3. In a possible embodiment of this application, the housing 1 has a first surface 101 and a second surface 102 that are disposed opposite to each other. When the housing 1 is mounted on the circuit board, the first surface 101 may be disposed facing the circuit board, and the first surface 101 may further contact the circuit board to support the entire connector. In addition, a mounting groove 103 is disposed on the housing 1, the mounting groove 103 may run through the housing 1 in a direction from the first surface 101 to the second surface 102, and the terminal module 2 may be mounted in the mounting groove 103.

It may be understood that, in this application, the connector may include one or more terminal modules 2 based on a requirement of a specific application scenario. When the connector includes the plurality of terminal modules 2, the plurality of terminal modules 2 may be signally connected, or may be disposed independently. Correspondingly, one or more mounting grooves 103 may be disposed on the housing 1, so that the connector can be disposed in one mounting groove 103 in a one-to-one correspondence. For example, in the embodiment shown in FIG. 3, two mounting grooves 103 are disposed on the housing 1, and one terminal module 2 is mounted in each mounting groove 103.

As a key structure for connecting the connector to the circuit board, the terminal module 2 may include a connection terminal 201. There may be a plurality of connection terminals 201. The plurality of connection terminals 201 may be, but is not limited to, a power terminal, a ground terminal, a signal terminal configured to implement other signal transmission, or the like. In addition, in this application, cross-sectional areas of the connection terminals 201 may be the same or may be different, and may be adjusted based on a requirement of a signal transmitted by the connection terminal 201.

It can be learned from the foregoing descriptions of the housing 1 that the mounting groove 103 runs through the housing 1. In this embodiment of this application, reference may be made to FIG. 2 and FIG. 3 together. After the terminal module 2 is mounted in the mounting groove 103, a first end 2011 of the connection terminal 201 may extend out from the first surface 101 of the housing 1, and the first end 2011 of the connection terminal 201 may be signally connected to the circuit board. The first end 2011 of the connection terminal 201 may be bent to form a connection part, and the connection part may be elastically abutted against the circuit board, to simplify a mounting technique of the connection terminal 201 and the circuit board. In addition, the connection part has an end face facing the circuit board, and the end face may be configured to connect to the circuit board. This helps increase a contact area between the signal terminal and the circuit board, so that a connection between the signal terminal and the circuit board is reliable. In a possible embodiment of this application, the connection part may be further connected to the circuit board in a welding manner, to improve reliability of the connection between a connection part and the circuit board.

In this application, a specific shape of the connection terminal 201 is not limited. For example, in the foregoing embodiment, the first end 2011 of the connection terminal 201 is bent to form the connection part. In this case, the connection terminal 201 may be in an L-shaped structure.

In some embodiments of this application, when the plurality of connection terminals 201 of the terminal module 2 are arranged, for example, reference may be made to FIG. 2, and the plurality of connection terminals 201 may be arranged side by side at an interval, but is not limited to the arrangement. In addition, when the first end 2011 of the connection terminal 201 is bent to form the connection part, end faces of connection parts of the plurality of connection terminals 201 may be approximately aligned, to improve stability of a connection between the terminal module 2 and the circuit board, and implement reliability of signal transmission between the terminal module 2 and the circuit board.

Figure 4:
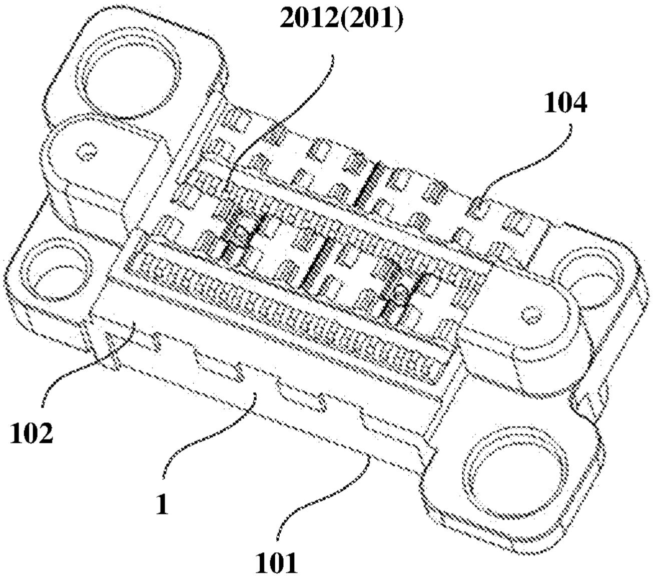
FIG. 4 is a schematic diagram of a structure of a connector according to another embodiment of this application.

Refer to FIG. 4. FIG. 4 is a schematic diagram of a structure of assembling the connection terminal 201 and the housing 1 according to an embodiment. The connection terminal 201 further has a second end 2012, and the second end 2012 may be exposed from the second surface 102 of the housing 1. Refer to FIG. 3 and FIG. 4 together. The second end 2012 may be configured to connect to a cable 4, so that the connection terminal 201 may perform signal connection to another device by using the cable 4. In this application, the second end 2012 of the connection terminal 201 may be connected to the cable 4 in a welding manner, but is not limited to the welding manner, so that a connection between the second end 2012 and the cable 4 is reliable.

Reference may be still made to FIG. 3 and FIG. 4. In some embodiments of this application, a plurality of limit structures 104 may be further disposed on the second surface 102 of the housing 1, and the plurality of limit structures 104 may be protrusion structures formed on the second surface 102. The plurality of limit structures 104 may be configured to limit the cable 4 connected to the second end 2012 of the connection terminal 201, to limit a position of the cable 4. In addition, the protection structure 3 mentioned in the foregoing embodiment may also fix the cable 4 and the connection terminal 201 while fixing and protecting the terminal module 2, and protect a joint between the cable 4 and the connection terminal 201.

Figure 5:
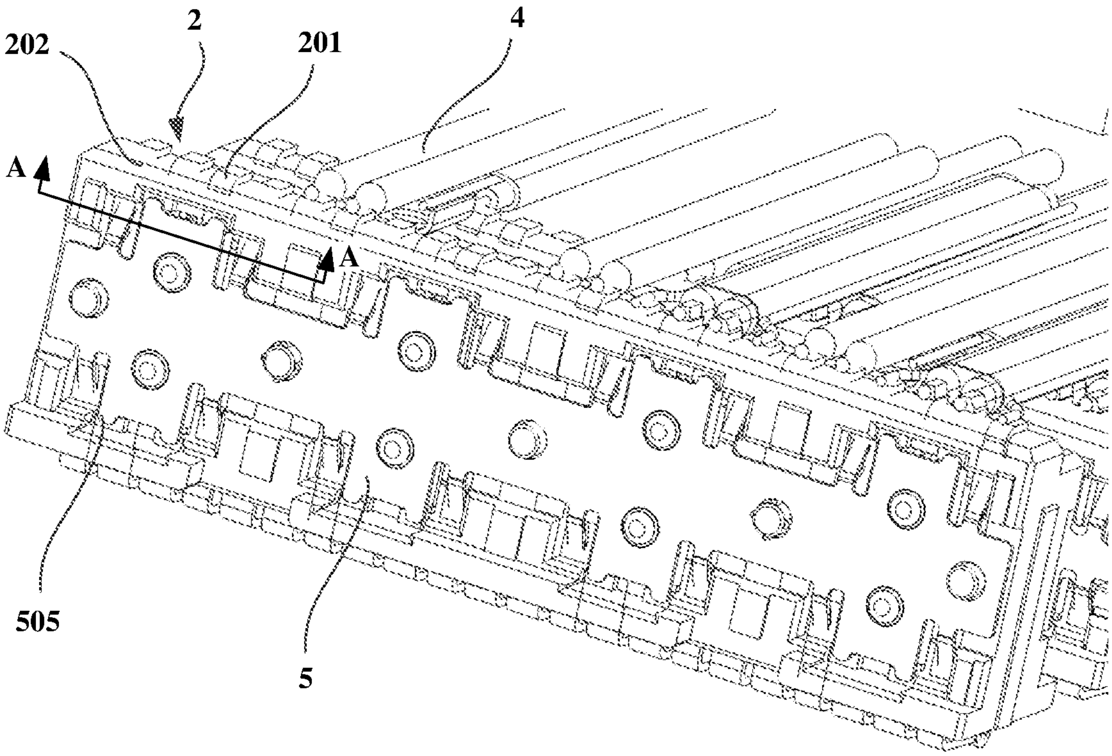
FIG. 5 is a schematic diagram of a structure of assembling a terminal module and a shielding part according to an embodiment of this application.

Refer to FIG. 5. FIG. 5 is a schematic diagram of a structure of assembling the terminal module 2 and the shielding part 5 according to an embodiment of this application. In some embodiments of this application, the terminal module 2 may further include a fastening part 202, and the fastening part 202 may be configured to fix a connection terminal 201. In addition, the terminal module 2 may generally include a plurality of connection terminals 201. When fixing the plurality of connection terminals 201, the fastening part 202 may further limit the plurality of connection terminals 201, to adjust spacing between adjacent connection terminals 201. A material of the fastening part 202 may be, but is not limited to, an insulation material such as plastic or ceramic, to avoid a short circuit between the adjacent connection terminals 201.

Figure 6:
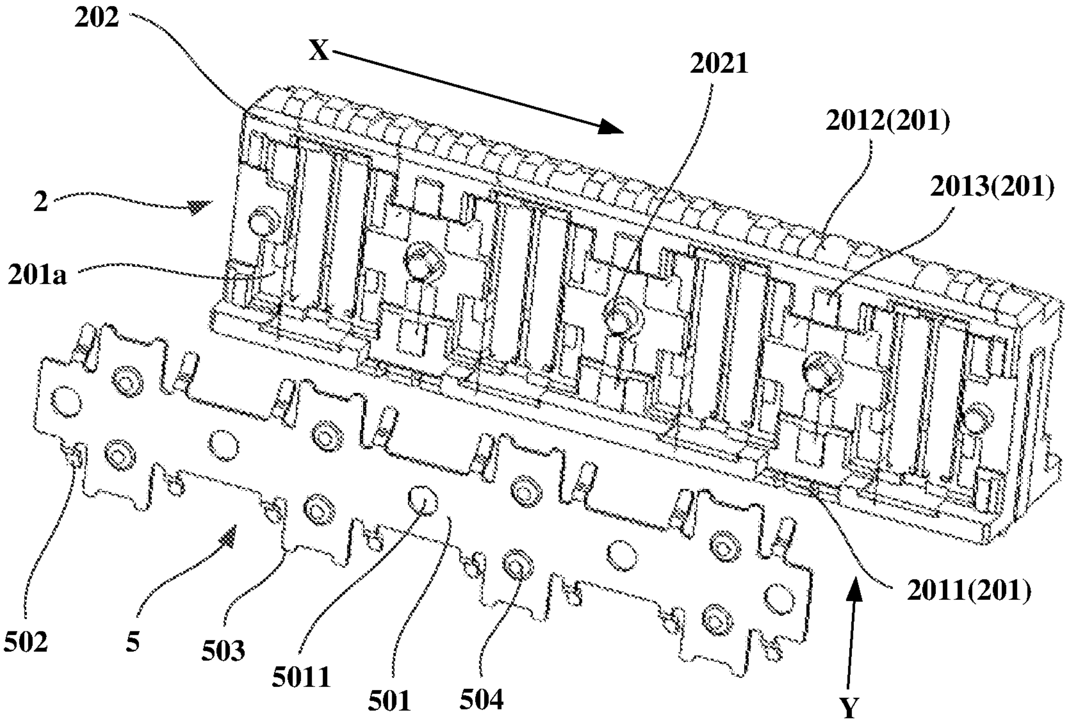
FIG. 6 is a schematic diagram of a split structure of a terminal module and a shielding part according to an embodiment of this application.

Refer to FIG. 6. FIG. 6 is a schematic diagram of a split structure of the terminal module 2 and the shielding part 5 according to an embodiment of this application. In this application, a part that is of the connection terminal 201 and that is configured to connect the first end 2011 and the second end 2012 may be denoted as a terminal body 2013 of the connection terminal 201. Because the first end 2011 of the connection terminal 201 is configured to perform signal connection to the circuit board, and the second end 2012 is connected to the cable 4 (not shown in FIG. 6, and reference may be made to FIG. 5), the fastening part 202 may be fastened to the terminal body 2013 of the connection terminal 201, and the fastening part 202 is filled between the two adjacent connection terminals 201.

It may be understood from the descriptions of the connection terminal 201 in the foregoing embodiment that, to reduce crosstalk between the connection terminals 201, the terminal body 2013 of the connection terminal 201 may be shielded. Therefore, a shielding manner for the terminal body 2013 affects overall signal transmission performance of the connection terminal 201. Therefore, reference may be made to FIG. 5 and FIG. 6 together. The connector may further include the shielding part 5. The shielding part 5 is fastened to the terminal module 2, and the shielding part 5 is in conductive contact with a ground terminal 201*a* in the connection terminal 201.

Figure 7:
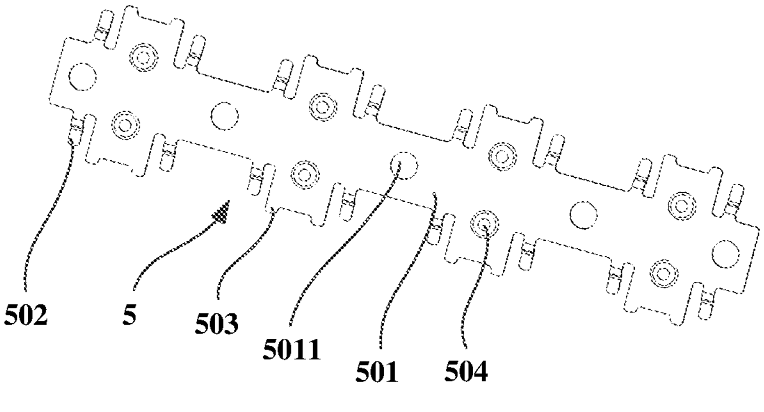
FIG. 7 is a schematic diagram of a structure of a shielding part according to an embodiment of this application.

When the shielding part 5 is specifically disposed, reference may be made to FIG. 6 and FIG. 7 together. FIG. 7 is a schematic diagram of a structure of the shielding part 5 according to a possible embodiment of this application. The shielding part 5 may include a shielding body 501 and a contact arm 502. The shielding body 501 is fastened to the terminal module 2, and covers at least a part of the terminal body 2013 of the connection terminal 201. The shielding body 501 may be in a sheet structure, to reduce space occupied by the shielding part 5 in the connector, and facilitate implementation of a miniaturization design of the connector. The shielding body 501 and the terminal module 2 may be fixed in a plurality of manners. For example, refer to FIG. 6. A mounting hole 5011 may be disposed on the shielding body 501, and a holding structure 2021 may be disposed on the fastening part 202 of the terminal module 2. The holding structure 2021 may be inserted into the mounting hole 5011 of the shielding body 501, so that the shielding body 501 and the terminal module 2 are clamped and fixed by using an interference fit. In some possible embodiments, the fastening part 202 may be plastic, and the shielding body 501 and the fastening part 202 may be further fixed in a manner such as hot riveting. In this embodiment of this application, the shielding part 5 and the fastening part 202 are fixed without using another structure for auxiliary limiting and holding, which helps simplify a structure of the terminal module 2.

The contact arm 502 of the shielding part 5 may be configured to be in conductive contact with the ground terminal 201*a* in the connection terminal 201. In some embodiments of this application, the contact arm 502 may be an elastic arm, and the contact arm 502 may be elastically abutted against the ground terminal 201*a*, so that reliability of contact between the contact arm 502 and the ground terminal 201*a* can be improved. In addition, when the shielding body 501 is fastened to the fastening part 202, a connection force between the shielding body 501 and the fastening part 202 may be further adjusted, so that the contact arm 502 can be pressed towards the ground terminal 201*a*. Therefore, a stable electrical connection between the contact arm 502 and the ground terminal 201*a* can be implemented without making an additional connection structure or using an additional welding technique, to reduce mounting complexity and costs of the terminal module 2.

In a possible embodiment of this application, reference may be made to FIG. 6. The shielding part 5 is an integrally formed structure, and the contact arm 502 is a bent part that is formed on the shielding body 501 and that is bent towards a side of the ground terminal 201*a*. It may be understood that, in this embodiment of this application, the shielding part 5 may be, but is not limited to, a metal sheet having good conductivity.

Refer to FIG. 6. In some embodiments of this application, one shielding part 5 may be disposed on each terminal module 2, and the shielding part 5 may shield all connection terminals 201 of the terminal module 2. In this way, assembly efficiency of the terminal module 2 and the shielding part 5 can be reduced. Generally, the terminal module 2 has a plurality of ground terminals 201*a*. In this case, the shielding part 5 may be provided with a plurality of contact arms 502, and the plurality of contact arms 502 may be in conductive contact with the plurality of ground terminals 201*a* in a one-to-one correspondence.

In addition, an extension direction of the shielding body 501 may be the same as an arrangement direction (a direction of X in FIG. 6) of the plurality of connection terminals 201 in the terminal module 2. Reference may be still made to FIG. 6. In a direction (a direction of Y in FIG. 6) from the first end 2011 to the second end 2012 of the connection terminal 201, a plurality of contact arms 502 are separately disposed on two sides of the shielding part 5. In this way, a signal return path can be effectively increased, and crosstalk performance of the terminal module 2 can be improved.

In addition to the foregoing structure, the shielding part 5 may further include an abutting part 503 connected to the shielding body 501. Refer to FIG. 5. The abutting part 503 may be configured to be abutted against the fastening part 202, and may limit spacing between the body of the shielding part 5 and the signal terminal in the connection terminal 201, to avoid a short circuit between signal terminals caused by contact between the shielding body 501 and the signal terminal. Reference may be made to FIG. 6. In the extension direction of the shielding part 5, the abutting part 503 may be disposed between two adjacent contact arms 502. In this embodiment of this application, a plurality of abutting parts 503 may be disposed on the shielding part 5, to implement multi-point contact between the shielding body 501 and the fastening part 202. This helps improve structural stability of the shielding part 5.

In some other embodiments of this application, a plurality of shielding parts 5 may be alternatively disposed in each terminal module 2. During specific implementation, the plurality of shielding parts 5 may be arranged in sequence in an arrangement direction of the plurality of connection terminals 201, and adjacent shielding parts 5 may be in direct contact, may be in indirect contact, or may not be in contact. In some other embodiments of this application, when the terminal module 2 includes a plurality of differential pairs, one shielding part 5 may be further disposed corresponding to N differential pairs, where N is less than a total quantity of differential pairs in the terminal module 2. In this embodiment, the shielding part 5 may be disposed with reference to any one of the foregoing embodiments. Details are not described herein again.

Reference may be made to FIG. 7. The shielding part 5 may further be provided with a contact point 504, where the contact point 504 may be configured to be in conductive contact with the housing 1 shown in FIG. 4, to effectively increase a signal return path. This helps improve crosstalk performance of the terminal module 2 and improve communication performance of the connector.

In this embodiment of this application, a specific quantity and positions of contact points 504 are not limited. In the embodiment shown in FIG. 7, the contact point 504 may be disposed on the shielding body 501, and the contact point 504 may be a protrusion structure formed on the shielding body 501.

In addition to using the foregoing shielding part 5, the crosstalk may be further improved by optimizing a coupling degree of the connection terminal 201. During specific implementation, reference may be made to FIG. 6. A hollow area may be disposed on a side that is of the fastening part 202 and that faces the shielding part 5, so that a part of the terminal body 2013 of the connection terminal 201 may be exposed from the fastening part 202, to reduce a crosstalk impact between different differential pairs.

Figure 8:
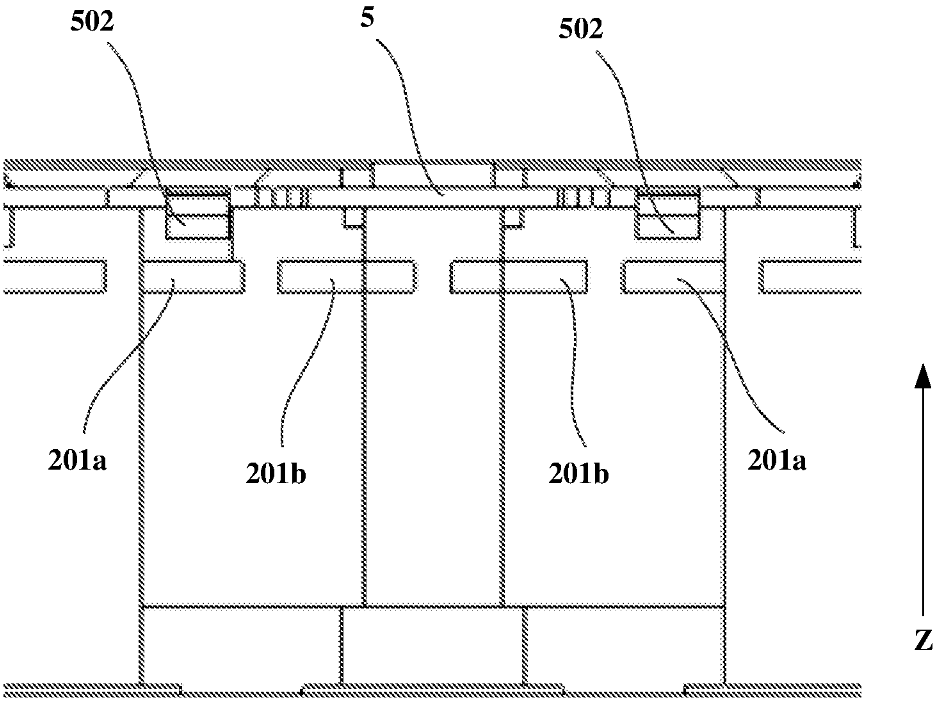
FIG. 8 is a sectional view of A-A in FIG. 5.

In some other embodiments of this application, reference may be made to FIG. 8. FIG. 8 is a sectional view of A—A in FIG. 5. Alternatively, a tight coupling of an electric field in an area may be implemented by reducing spacing between two adjacent signal terminals 201*b* in the terminal module, spacing between the signal terminal 201*b* and the adjacent ground terminal 201*a*, and spacing between the signal terminal 201*b* and the shielding part 5. Therefore, an insertion loss and crosstalk are reduced, and a dependence degree of the connector on the shielding part 5 can be effectively reduced.

For example, the spacing between the two signal terminals 201*b* in the differential pair may be 0.7 to 2.5 times a thickness of the signal terminal 201*b*, the spacing between the signal terminal 201*b* and the adjacent ground terminal 201*a* is 0.7 to 2.5 times the thickness of the signal terminal 201*b*, and the spacing between the signal terminal 201*b* and the shielding part 5 is 0.7 to 2.5 times the thickness of the signal terminal 201*b*. The thickness of the signal terminal 201*b* is a size of the signal terminal in a cross section in a direction (a direction of Z in FIG. 8) from the signal terminal to the shielding part 5. It should be noted that, in this application, the spacing between the signal terminal 201*b* and the shielding part 5 is a distance between the signal terminal 201*b* and the shielding part 5 in the direction of Z in the cross section shown in FIG. 8.

Figure 9:
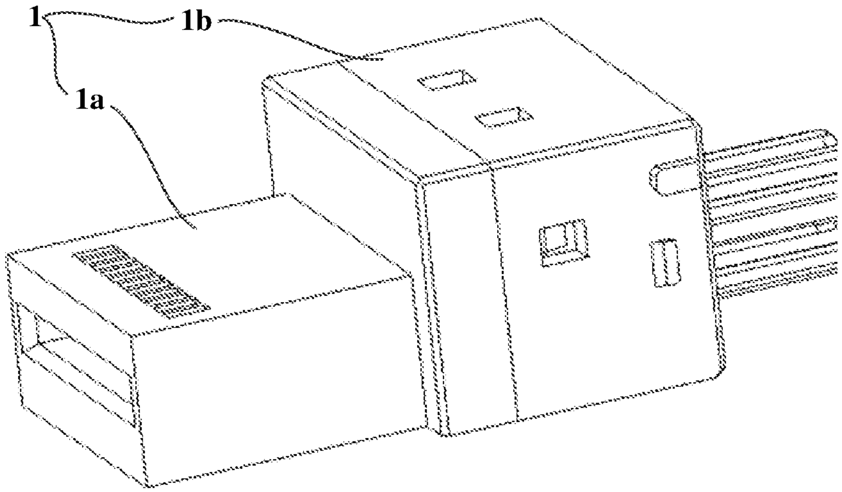
FIG. 9 is a schematic diagram of a structure of a connector according to another embodiment of this application.
Figure 10:
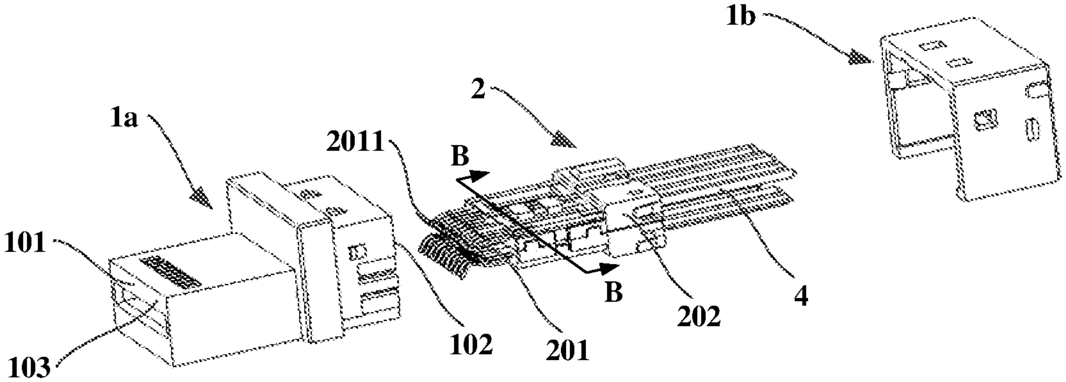
FIG. 10 is a schematic diagram of a split structure of a connector according to another embodiment of this application.

Refer to FIG. 9. FIG. 9 is a schematic diagram of a structure of a connector according to another embodiment of this application. For example, the connector in this embodiment may be an I/O end connector. Reference may be made to FIG. 9 and FIG. 10 together. FIG. 10 is a schematic diagram of a split structure of the connector shown in FIG. 9. In this embodiment, the connector may include a housing 1 and a terminal module 2. The housing 1 may include a fixed housing 1*a* and a conductive housing 1*b*. The fixed housing 1*a* may be configured to support and fix the terminal module 2. The conductive housing 1*b* may be disposed to cover the terminal module 2, and is configured to implement grounding of the terminal module 2. The conductive housing 1*b* may be fastened to the fixed housing 1*a*.

In this embodiment, a material of the fixed housing 1*a* may be, but is not limited to, an insulation material such as plastic or ceramic. In addition, the fixed housing 1*a* may be an injection molding part, and may be directly formed on the terminal module 2 by using one injection molding technique, to effectively improve reliability of a connection between the fixed housing 1*a* and the terminal module 2.

Still refer to FIG. 10. The fixed housing 1*a* has a first surface and a second surface that are disposed opposite to each other. In addition, the fixed housing 1*a* is provided with a mounting groove 103, and the mounting groove 103 may run through the fixed housing 1*a* in a direction from the first surface 101 to the second surface 102.

As a key structure for connecting the connector to another device, the terminal module 2 may be mounted in the mounting groove 103 of the fixing housing 1*a*. In this embodiment, the terminal module 2 may be disposed in a thin sheet structure. In addition, there may be two terminal modules 2, and the two terminal modules 2 are fit to each other. The terminal module 2 has a connection terminal 201. There may be a plurality of connection terminals 201, and the plurality of connection terminals 201 may be disposed side by side at an interval, but is not limited to the disposition. The plurality of connection terminals 201 may be, but is not limited to, a power terminal, a ground terminal, a signal terminal configured to implement other signal transmission, or the like. In addition, in this application, cross-sectional areas of the connection terminals 201 may be the same or may be different, and may be adjusted based on a requirement of a signal transmitted by the connection terminal 201.

In this embodiment of this application, refer to both FIG. 9 and FIG. 10. After the terminal module 2 is mounted in the mounting groove 103, a first end 2011 of the connection terminal 201 does not extend out from the first surface 101 of the fixed housing 1*a*, but is hidden in the fixed housing 1*a*. Because the mounting groove 103 runs through the fixed housing 1*a*, a circuit board may be inserted into the mounting groove 103 on a side of the first surface 101 of the fixed housing 1*a*, to be signally connected to the first end 2011 of the connection terminal 201. A connection manner may be but is not limited to welding.

Refer to FIG. 10. In some embodiments of this application, first ends 2011 of connection terminals 201 of two terminal modules 2 may be separately bent in opposite directions. In this way, a guiding function may be provided for insertion of the circuit board, to facilitate a connection between the circuit board and the connector. In addition, bent parts of the connection terminals 201 of the two terminal modules 2 may be elastically abutted against the circuit board. This helps improve reliability of a connection between the connection terminal 201 and the circuit board.

The connection terminal 201 further has a second end (not shown in the figure), and the second end may be configured to connect to a cable 4, so that the connection terminal 201 can perform signal connection to another device by using the cable 4. In this application, the second end of the connection terminal 201 may be connected to the cable 4 in a welding manner, but is not limited to the welding manner, so that a connection between the second end and the cable 4 is reliable. In addition, in some embodiments of this application, the conductive housing 1*b* may be further configured to implement a common ground connection between the terminal module 2 and the cable 4.

In some embodiments of this application, the terminal module 2 may further include a fastening part 202, and the fastening part 202 may be configured to fix the connection terminal 201. In addition, the terminal module 2 may generally include the plurality of connection terminals 201. When fixing the plurality of connection terminals 201, the fastening part 202 may further limit the plurality of connection terminals 201, to adjust spacing between adjacent connection terminals 201. A material of the fastening part 202 may be, but is not limited to, an insulation material such as plastic or ceramic, to avoid a short circuit between the adjacent connection terminals 201.

Similar to the foregoing embodiment, in this embodiment of this application, a part that is of the connection terminal 201 and that is configured to connect the first end 2011 and the second end may also be denoted as a terminal body of the connection terminal 201. Because the first end 2011 of the connection terminal 201 is configured to perform signal connection to the circuit board, and the second end is connected to the cable 4, the fastening part 202 may be fastened to the terminal body of the connection terminal 201, and the fastening part 202 is filled between the two adjacent connection terminals 201.

Figure 11:
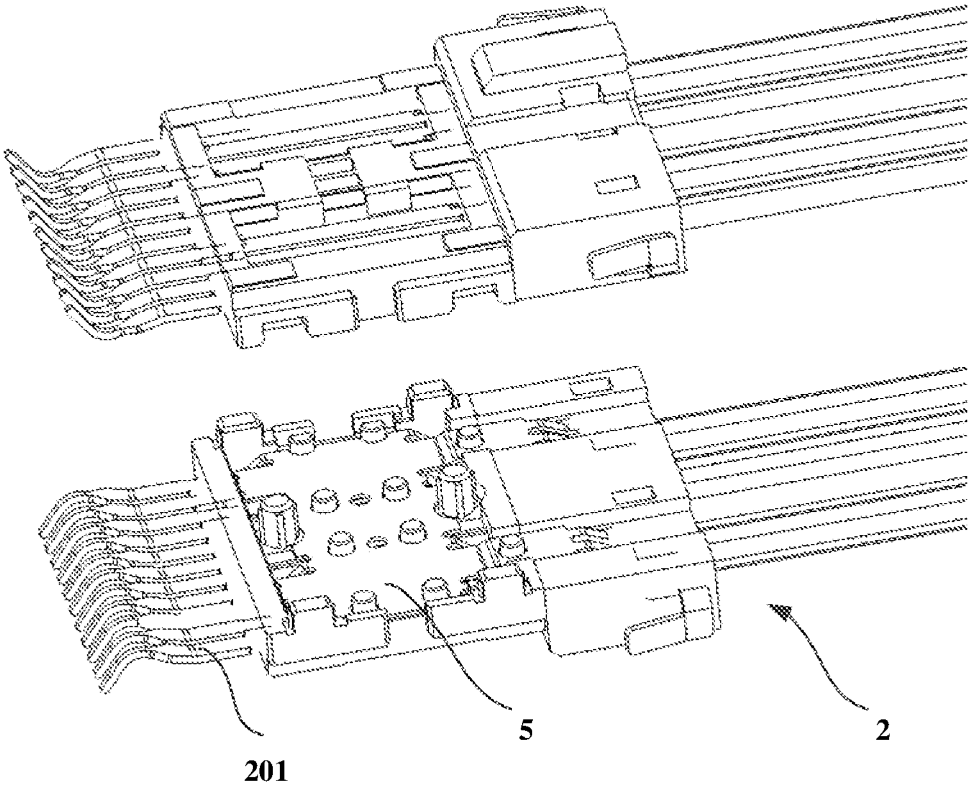
FIG. 11 is a schematic diagram of a structure of assembling a terminal module and a shielding part according to another embodiment of this application.

In this application, to reduce crosstalk between the connection terminals 201, the terminal body of the connection terminal 201 may be shielded. Therefore, a shielding manner for the terminal body affects overall signal transmission performance of the connection terminal 201. Therefore, the connector in this embodiment of this application may further include a shielding part 5. Refer to FIG. 11. FIG. 11 is a schematic diagram of a structure of assembling the terminal module 2 and the shielding part 5 according to another embodiment of this application. The shielding part 5 is fastened to the terminal module 2, and the shielding part 5 is in conductive contact with the ground terminal in the connection terminal 201.

Figure 12:
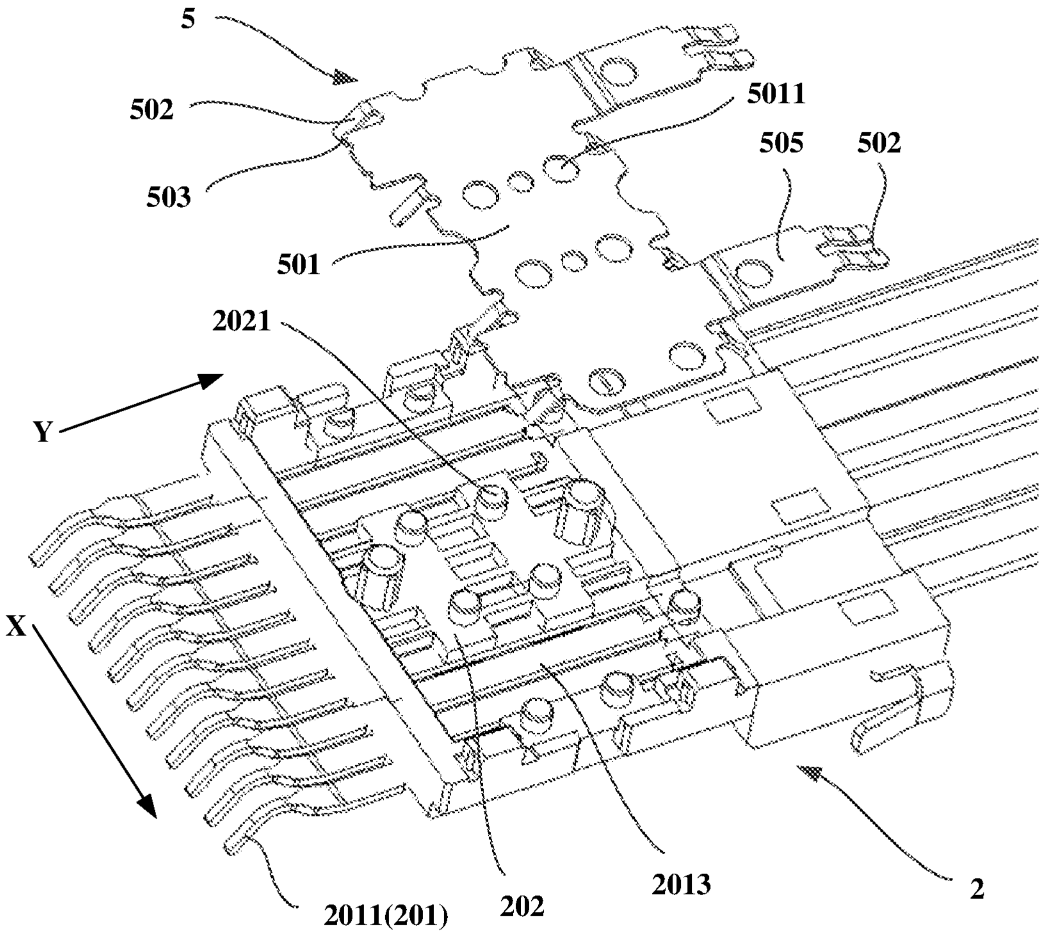
FIG. 12 is a schematic diagram of a split structure of a terminal module and a shielding part according to another embodiment of this application.

In this embodiment, a manner of disposing the shielding part 5 is similar to that in the foregoing embodiment. During specific implementation, reference may be made to FIG. 12. FIG. 12 is a schematic diagram of a split structure of the shielding part 5 and the terminal module 2 according to another embodiment of this application. The shielding part 5 may include a shielding body 501 and a contact arm 502, where the shielding body 501 is fastened to the terminal module 2, and covers at least a part of the terminal body 2013 of the connection terminal 201. The shielding body 501 and the terminal module 2 may be fixed in a plurality of manners. For example, a mounting hole 5011 may be disposed on the shielding body 501, and a holding structure 2021 may be disposed on the fastening part 202 of the terminal module 2. The holding structure 2021 may be a protrusion structure formed on the fastening part 202. The holding structure 2021 may be inserted into the mounting hole 5011 of the shielding body 501, so that the holding structure 2021 and the shielding body 501 are clamped and fixed by using an interference fit. In some possible embodiments, the fastening part 202 may be plastic, and the shielding body 501 and the fastening part 202 may be further fixed in a manner such as hot riveting. In this embodiment of this application, the shielding part 5 and the fastening part 202 are fixed without using another structure for auxiliary limiting and holding. This helps simplify a structure of the terminal module 2.

The contact arm 502 of the shielding part 5 may be configured to be in conductive contact with the ground terminal in the connection terminal 201. In some embodiments of this application, the contact arm 502 may be an elastic arm, and the contact arm 502 may be elastically abutted against the ground terminal, so that reliability of contact between the contact arm 502 and the ground terminal can be improved. In addition, when the shielding body 501 is fastened to the fastening part 202, a connection force between the shielding body 501 and the fastening part 202 may be further adjusted, so that the contact arm 502 can be pressed towards the ground terminal. Therefore, stable conductive contact between the contact arm 502 and the ground terminal can be implemented without making an additional connection structure or using an additional welding technique, to reduce mounting complexity and costs of the terminal module 2.

In a possible embodiment of this application, the shielding part 5 is an integrally formed structure, and the contact arm 502 is a bent part that is connected to the shielding body 501 and that is bent towards a side of the ground terminal. It may be understood that, in this embodiment of this application, the shielding part 5 may be, but is not limited to, a metal sheet having good conductivity.

Refer to FIG. 12. In some embodiments of this application, one shielding part 5 may be disposed on each terminal module 2, and the shielding part 5 may shield all connection terminals 201 of the terminal module 2. In this way, assembly efficiency of the terminal module 2 can be reduced. Generally, the terminal module 2 has a plurality of ground terminals. In this case, the shielding part 5 may be provided with a plurality of contact arms 502, and the plurality of contact arms 502 may be in conductive contact with the plurality of ground terminals in a one-to-one correspondence.

In addition, an extension direction of the shielding part 5 may be the same as an arrangement direction (a direction of X in FIG. 12) of the plurality of connection terminals 201 in the terminal module 2. Reference may be still made to FIG. 12. In a direction (a direction of Y in FIG. 12) from the first end 2011 to the second end of the connection terminal 201, the plurality of contact arms 502 are separately disposed on two sides of the shielding part 5. In this way, a signal return path can be effectively increased, and crosstalk performance of the terminal module 2 can be improved.

In addition to the foregoing structure, the shielding part 5 may further include an abutting part 503. The abutting part 503 may be configured to be abutted against the fastening part 202, and may limit spacing between the body of the shielding part 5 and the connection terminal 201, to avoid a short circuit between signal terminals caused by contact between the shielding body 501 and the signal terminal of the connection terminal 201. Reference may be made to FIG. 12. In the extension direction of the shielding part 5, the abutting part 503 may be disposed between two adjacent contact arms 502. In this embodiment of this application, a plurality of abutting parts 503 may be disposed on the shielding part 5, to implement multi-point contact between the body of the shielding part 5 and the fastening part 202. This helps improve structural stability of the shielding part 5.

Still refer to FIG. 12. The shielding part 5 may further include an extension part 505 connected to the shielding body 501, and the extension part 505 extends in a direction from the shielding body 501 to the second end of the connection terminal 201. In addition, the contact arm 502 may be alternatively disposed at an end that is of the extension part 505 and that is far away from the shielding body 501, and the contact arm 502 may be alternatively in conductive contact with the ground terminal, to further reduce crosstalk.

In some other embodiments of this application, a plurality of shielding parts 5 may be alternatively disposed in each terminal module 2. During specific implementation, the plurality of shielding parts 5 may be arranged in sequence in an arrangement direction of the plurality of connection terminals 201, and adjacent shielding parts 5 may be in direct contact, may be in indirect contact, or may not be in contact. In some other embodiments of this application, when the terminal module 2 includes a plurality of differential pairs, one shielding part 5 may be further disposed corresponding to N differential pairs, where N is less than a total quantity of differential pairs in the terminal module 2. In this embodiment, the shielding part 5 may be disposed with reference to the foregoing embodiment. Details are not described herein again.

Figure 13:
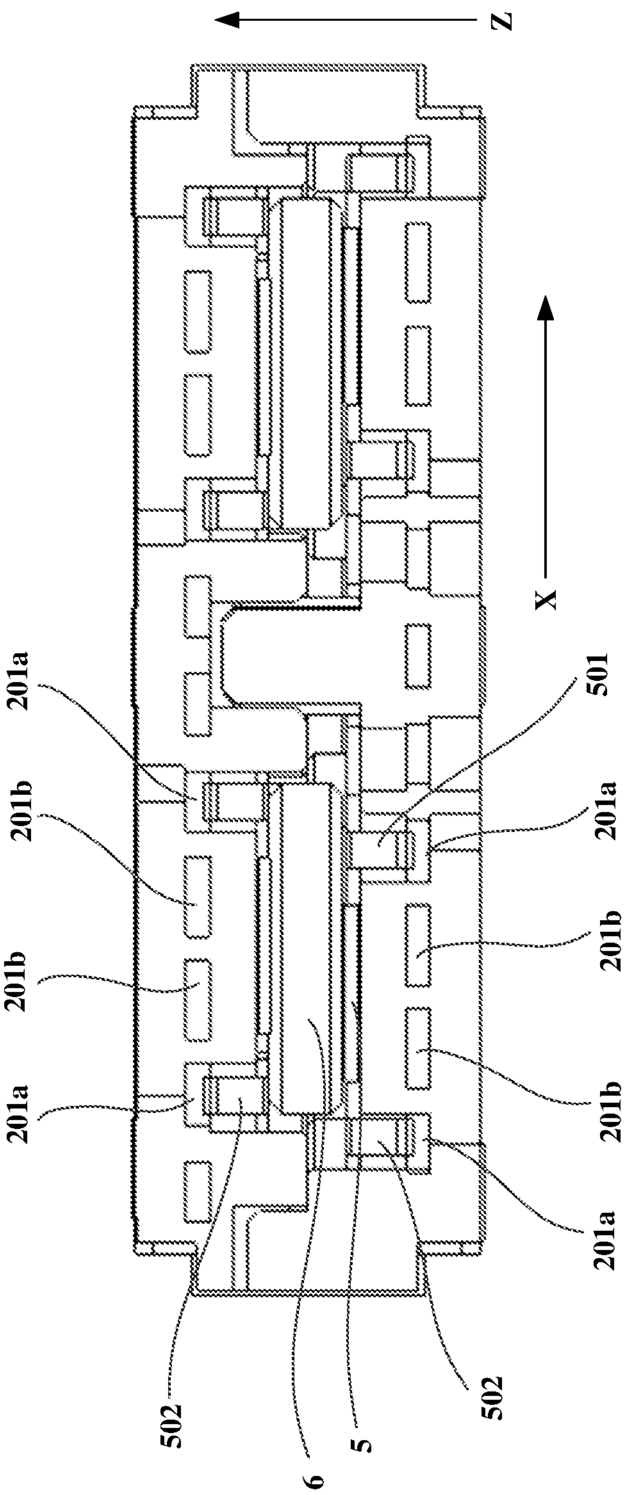
FIG. 13 is a sectional view in a B-B direction in FIG. 10.

Because this embodiment of this application includes two fastened terminal modules 2, the two terminal modules 2 may share the shielding part 5, or the shielding part 5 is disposed separately for each terminal module 2. Refer to FIG. 13. FIG. 13 is a sectional view of B-B of the terminal module 2 shown in FIG. 10. When the shielding part 5 is disposed on each terminal module 2, a plug 6 may be disposed between the two terminal modules 2, and the plug 6 may be made of, but is not limited to, a material such as plastic that may undergo plastic deformation. The plug block 6 undergoes plastic deformation to apply an extrusion force to the shielding parts 5 on two sides, to press the shielding parts 5 towards the corresponding terminal module 2, and further improve reliability of contact between the contact arm 502 of the shielding part 5 and the corresponding ground terminal 201*a*.

Reference may be still made to FIG. 13. In this embodiment of this application, a tight coupling of an electric field in an area may be implemented by reducing spacing between two adjacent signal terminals 201*b* in the terminal module, spacing between the signal terminal 201*b* and the adjacent ground terminal 201*a*, and spacing between the signal terminal 201*b* and the shielding part 5. Therefore, an insertion loss and crosstalk are reduced, and a dependence degree of the connector on the shielding part 5 can be effectively reduced.

In a possible embodiment of this application, the spacing between the two signal terminals 201*b* in the differential pair may be 0.7 to 2.5 times a thickness of the signal terminal 201*b*, the spacing between the signal terminal 201*b* and the adjacent ground terminal 201*a* is 0.7 to 2.5 times the thickness of the signal terminal 201*b*, and the spacing between the signal terminal 201*b* and the shielding part 5 is 0.7 to 2.5 times the thickness of the signal terminal 201*b*. The thickness of the signal terminal 201*b* is a size of the signal terminal in a cross section in a direction from the signal terminal 201*b* to the shielding part 5. It should be noted that, in this application, the spacing between the signal terminal 201*b* and the shielding part 5 is a distance between the signal terminal 201*b* and the shielding part 5 in the direction of Z in the cross section shown in FIG. 8.

In addition, in an arrangement direction (a direction of X in FIG. 13) of the connection terminals 201 in each terminal module 2, the connection terminals 201 in the two terminal modules 2 are disposed in a staggered manner. In a specific embodiment, signal terminals 201*b* at corresponding positions of the two terminal modules 2 are disposed in a staggered manner, and ground terminals 201*a* at the corresponding positions of the two terminal modules 2 are disposed in a staggered manner.

It can be understood that, the ground terminals 201*a* at the corresponding positions of the two terminal modules 2 are disposed in a staggered manner, so that contact points of contact arms 502 of shielding parts 5 of the two terminal modules 2 can be disposed in a staggered manner, to effectively implement partial crosstalk cancellation and improve crosstalk.

Figure 14:
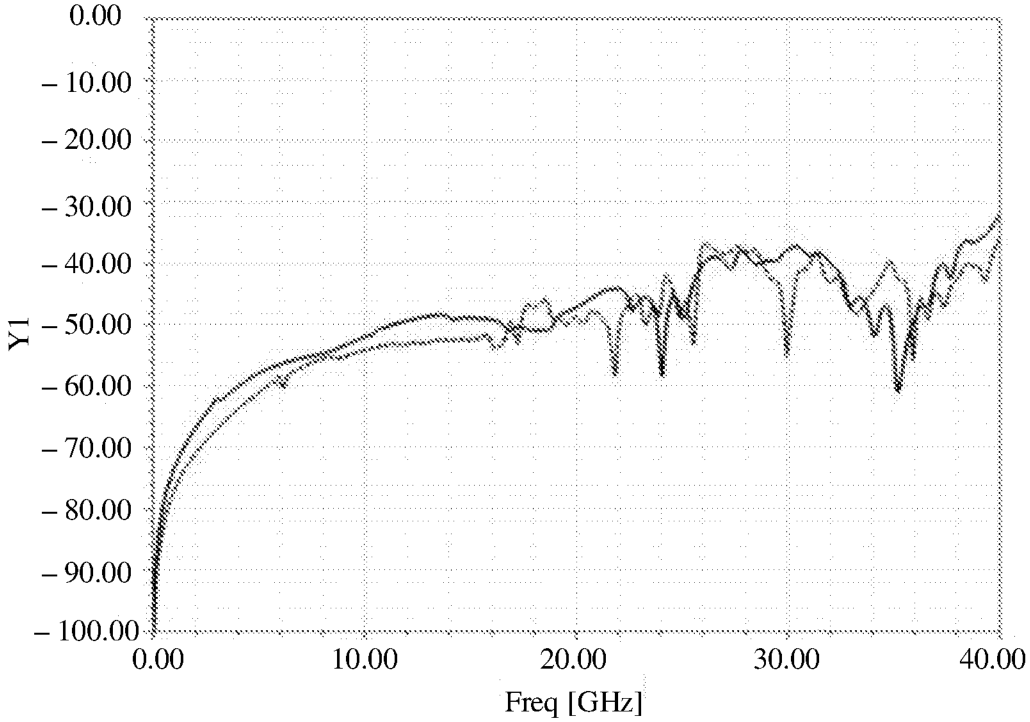
FIG. 14 is a diagram of a comparison curve of crosstalk according to an embodiment of this application.

Refer to FIG. 14. FIG. 14 is a diagram of a comparison curve of crosstalk between a connector according to a possible embodiment of this application and a conventional connector that is fixed by using a single shielding part in an abnormal-shaped welding manner. In FIG. 14, a horizontal coordinate represents a signal frequency, and a vertical coordinate represents a crosstalk value. A solid line represents a crosstalk curve diagram of the foregoing conventional connector, and a dashed line represents a crosstalk curve diagram of the connector in this application. It can be found through comparison that, by using the shielding solution of the connector in this application, signal crosstalk of 0-16 GHz can be reduced by about 2 dB as a whole. In addition, by using the shielding solution provided in this application, processing of a terminal module and a shielding part mold can be further effectively simplified, an assembly process is reduced, and assembly difficulty is reduced, to reduce costs.

It may be understood that, in addition to a plate end connector and an I/O end connector in the foregoing embodiments, the shielding solution of the connector provided in this application may be further applied to various other connectors that need to be shielded and that have shielding part disposition space. All the connectors may be disposed with reference to any one of the foregoing embodiments. Details are not described herein, but it should be understood that the shielding solution falls within the protection scope of this application.

Based on a same inventive concept, this application further provides a communication device. The communication device includes a circuit board and the connector in any one of the foregoing embodiments. The connector may be signally connected to the circuit board. In this way, another device may be connected to the circuit board by using the connector, to implement an electrical connection between the another device and the circuit board. Because crosstalk of the connector provided in this application is significantly improved, signal transmission performance of the communication device can be effectively improved.

Apparently, a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. A connector, comprising a terminal module and a shielding part, wherein the terminal module comprises a plurality of connection terminals, the plurality of connection terminals comprise a signal terminal and a ground terminal, and a connection terminal of the plurality of connection terminals comprises a first end and a second end, and a terminal body that connects the first end and the second end; and the shielding part comprises a shielding body and a contact arm, the contact arm is fastened to the shielding body, the shielding body covers at least a part of the terminal body, the contact arm is elastically abutted against the ground terminal and is electrically connected to the ground terminal, wherein the plurality of connection terminals comprise a plurality of signal terminals and a plurality of ground terminals, the connector comprises two terminal modules, and the two terminal modules are configured to fit each other, and in an arrangement direction of the plurality of connection terminals, ground terminals at corresponding positions of the two terminal modules are disposed in a staggered manner, and wherein the shielding part is disposed on each terminal module, a pressing block is further disposed between the two terminal modules, and the pressing block presses each shielding part towards its corresponding terminal module.

2. The connector according to claim 1, wherein the terminal module further comprises a fastening part, the fastening part is fastened to terminal bodies of the plurality of connection terminals, and the fastening part is filled between two adjacent connection terminals.

3. The connector according to claim 2, wherein the shielding part is provided with a mounting hole, and the fastening part is provided with a holding structure; and the holding structure is inserted into the mounting hole and is in an interference fit with the mounting hole.

4. The connector according to claim 2, wherein the shielding part further comprises an abutting part connected to the shielding body, and the abutting part is abutted against the fastening part.

5. The connector according to claim 1, wherein the shielding part further comprises an extension part connected to the shielding body, and the extension part extends from the shielding body to the second end of the connection terminal; and the contact arm is disposed at an end that is of the extension part and that is away from the shielding body, and the contact arm is in conductive contact with the ground terminal.

6. The connector according to claim 1, wherein spacing between two adjacent signal terminals of the plurality of signal terminals is 0.7 to 2.5 times a thickness of the signal terminal, spacing between the signal terminal and an adjacent ground terminal of the plurality of ground terminals is 0.7 to 2.5 times the thickness of the signal terminal, and spacing between the signal terminal and the shielding part is 0.7 to 2.5 times the thickness of the signal terminal.

7. The connector according to claim 1, wherein the shielding part is an integrally formed structure, and the contact arm is a bent part that is formed on the shielding body and that is bent towards a side of the ground terminal.

8. The connector according to claim 1, wherein the connector further comprises a housing, the housing has a first surface and a second surface that are disposed opposite to each other, the housing comprises a mounting groove, and the mounting groove runs through the housing in a direction from the first surface to the second surface; and the terminal module is mounted in the mounting groove.

9. The connector according to claim 8, wherein the first end of the connection terminal is exposed from the first surface, and the first end is signally connected to a circuit board; and the second end of the connection terminal is exposed from the second surface, and the second end is connected to a cable.

10. The connector according to claim 8, wherein the shielding part further comprises a contact point, the contact point is located on the shielding body and is in conductive contact with the housing.

11. The connector according to claim 8, wherein the connector further comprises a protection structure, and the protection structure covers the terminal module, and is fastened to the terminal module and the housing.

12. The connector according to claim 1, wherein the connector further comprises a housing, the housing comprises a fixed housing and a conductive housing, the fixed housing has a first surface and a second surface that are disposed opposite to each other, the fixed housing comprises a mounting groove, and the mounting groove runs through the housing in a direction from the first surface to the second surface; and the terminal module is mounted in the mounting groove, and the conductive housing is disposed to cover the terminal module, to implement grounding of the terminal module.

13. The connector according to claim 12, wherein the first end of the connection terminal is hidden in the fixed housing, and a circuit board is inserted into the mounting groove on a side of the first surface of the fixed housing and is signally connected to the first end; and the second end of the connection terminal is exposed from the second surface, and the second end is connected to a cable.

14. A communication device, comprising a circuit board and a connector, the connector comprising a terminal module and a shielding part, wherein the terminal module comprises a plurality of connection terminals, the plurality of connection terminals comprise a signal terminal and a ground terminal, and a connection terminal of the plurality of connection terminals comprises a first end and a second end, and a terminal body that connects the first end and the second end; and the shielding part comprises a shielding body and a contact arm, the contact arm is fastened to the shielding body, the shielding body covers at least a part of the terminal body, the contact arm is elastically abutted against the ground terminal and is electrically connected to the ground terminal, wherein the connection terminal of the connector is signally connected to the circuit board, wherein the plurality of connection terminals comprise a plurality of signal terminals and a plurality of ground terminals, the connector comprises two terminal modules, and the two terminal modules are configured to fit each other, and in an arrangement direction of the plurality of connection terminals, ground terminals at corresponding positions of the two terminal modules are disposed in a staggered manner, and wherein the shielding part is disposed on each terminal module, a pressing block is further disposed between the two terminal modules, and the pressing block presses each shielding part towards its corresponding terminal module.

15. The communication device according to claim 14, wherein the terminal module further comprises a fastening part, the fastening part is fastened to terminal bodies of the plurality of connection terminals, and the fastening part is filled between two adjacent connection terminals.

16. The communication device according to claim 15, wherein the shielding part is provided with a mounting hole, and the fastening part is provided with a holding structure; and the holding structure is inserted into the mounting hole and is in an interference fit with the mounting hole.

17. The communication device according to claim 15, wherein the shielding part further comprises an abutting part connected to the shielding body, and the abutting part is abutted against the fastening part.

18. The communication device according to claim 14, wherein the shielding part further comprises an extension part connected to the shielding body, and the extension part extends from the shielding body to the second end of the connection terminal; and the contact arm is disposed at an end that is of the extension part and that is away from the shielding body, and the contact arm is in conductive contact with the ground terminal.

19. A connector, comprising a terminal module and a shielding part, wherein the terminal module comprises a plurality of connection terminals, the plurality of connection terminals comprise a signal terminal and a ground terminal, and a connection terminal of the plurality of connection terminals comprises a first end and a second end, and a terminal body that connects the first end and the second end; and the shielding part comprises a shielding body and a contact arm, the contact arm is fastened to the shielding body, the shielding body covers at least a part of the terminal body, the contact arm is elastically abutted against the ground terminal and is electrically connected to the ground terminal, wherein the connector further comprises a housing, the housing comprises a fixed housing and a conductive housing, the fixed housing has a first surface and a second surface that are disposed opposite to each other, the fixed housing comprises a mounting groove, and the mounting groove runs through the housing in a direction from the first surface to the second surface; and the terminal module is mounted in the mounting groove, and the conductive housing is disposed to cover the terminal module, to implement grounding of the terminal module, wherein the first end of the connection terminal is hidden in the fixed housing, and a circuit board is inserted into the mounting groove on a side of the first surface of the fixed housing and is signally connected to the first end; and the second end of the connection terminal is exposed from the second surface, and the second end is connected to a cable.

* * * * *